United States Patent
Hatta

(10) Patent No.: US 12,036,753 B2
(45) Date of Patent: Jul. 16, 2024

(54) METHOD FOR MANUFACTURING TANK AND MANUFACTURING DEVICE THEREOF

(71) Applicant: TOYOTA JIDOSHA KABUSHIKI KAISHA, Toyota (JP)

(72) Inventor: Ken Hatta, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/821,947

(22) Filed: Aug. 24, 2022

(65) Prior Publication Data
US 2023/0060650 A1     Mar. 2, 2023

(30) Foreign Application Priority Data
Aug. 26, 2021 (JP) .................. 2021-137789

(51) Int. Cl.
| | | |
|---|---|---|
| B29C 63/32 | (2006.01) | |
| B29C 70/22 | (2006.01) | |
| B29C 70/34 | (2006.01) | |
| B29K 105/10 | (2006.01) | |
| B29K 307/04 | (2006.01) | |
| B29L 31/00 | (2006.01) | |

(52) U.S. Cl.
CPC ............ B29C 70/345 (2013.01); B29C 63/32 (2013.01); B29C 70/222 (2013.01); B29K 2105/103 (2013.01); B29K 2307/04 (2013.01); B29L 2031/7156 (2013.01)

(58) Field of Classification Search
CPC .......... B29K 2105/103; B29K 2307/04; B29L 2031/7156
USPC ............................................. 264/241
See application file for complete search history.

(56) References Cited

U.S. PATENT DOCUMENTS

| | | |
|---|---|---|
| 2004/0206762 A1 | 10/2004 | Iida et al. |
| 2015/0034233 A1* | 2/2015 | Hatta ............. F17C 1/06 156/172 |
| 2017/0191618 A1 | 7/2017 | Kloft et al. |
| 2019/0084249 A1 | 3/2019 | Hatta |
| 2020/0049312 A1 | 2/2020 | Sawai |
| 2020/0171761 A1 | 6/2020 | Sawai et al. |

(Continued)

FOREIGN PATENT DOCUMENTS

| | | |
|---|---|---|
| DE | 69530126 T2 | 12/2003 |
| DE | 102014008649 A1 | 12/2015 |
| DE | 102019127919 A1 | 6/2020 |

(Continued)

*Primary Examiner* — Jeffrey M Wollschlager
*Assistant Examiner* — Xue H Liu
(74) *Attorney, Agent, or Firm* — Hunton Andrews Kurth LLP

(57) ABSTRACT

Provided is a method for manufacturing a tank and a manufacturing device thereof that can achieve resin impregnation within a short time. The method wraps fibers in an overlapping manner in a radial direction around an outer surface of a liner such that a first fiber layer (braiding layer) on an outer surface of a dome portion is less dense than a second fiber layer (helical layer) on an outer surface of a straight body portion and such that a portion of a lamina of the first fiber layer, which is less dense, is interposed continuously from the first fiber layer partially between laminae of the second fiber layer, and then impregnates the fiber layer including the first fiber layer and the second fiber layer with a resin.

6 Claims, 10 Drawing Sheets

(56) References Cited

U.S. PATENT DOCUMENTS

2020/0224823 A1\* 7/2020 Hatta ..................... B29C 63/08

FOREIGN PATENT DOCUMENTS

| EP | 1693180 A1 | \* | 8/2006 | ............. B29C 70/32 |
| EP | 4059701 A1 | | 9/2022 | |
| JP | 2018128116 A | \* | 8/2018 | ........... B29C 53/566 |
| JP | 2018187775 A | | 11/2018 | |
| JP | 2019056415 A | | 4/2019 | |
| JP | 2020026817 A | | 2/2020 | |
| JP | 2020085199 A | | 6/2020 | |

\* cited by examiner

METHOD FOR MANUFACTURING TANK AND MANUFACTURING DEVICE THEREOF

CROSS REFERENCE TO RELATED APPLICATIONS

The present application claims priority from Japanese patent application JP 2021-137789 filed on Aug. 26, 2021, the entire content of which is hereby incorporated by reference into this application.

BACKGROUND

Technical Field

The present disclosure relates to a method for manufacturing a fiber-reinforced tank and a manufacturing device thereof.

Background Art

JP 2020-085199 A discloses a method of manufacturing a fiber reinforced plastic (FRP) tank (hereinafter also referred to as a high-pressure tank). This manufacturing method first performs a coating step by wrapping fibers around a liner, then performs an impregnating step by impregnating the fibers with resin, and thereafter allows the resin to cure by heating the resin impregnated fibers.

JP 2019-056415 A discloses a method for manufacturing a high-pressure tank using such a resin transfer molding (RTM) method. This manufacturing method places a preform, in which a fiber layer is formed on an outer surface of a liner that forms an internal space of a high-pressure tank, in a mold, and rotates the preform in a circumferential direction in the mold about the central axis of the preform as a rotation center while injecting resin from a gate toward the preform placed in the mold.

SUMMARY

The above manufacturing method using the RTM method performs the fiber wrapping step and the resin impregnating step separately when manufacturing a high-pressure tank. However, due to a large amount of fibers wrapped around the high-pressure tank and a large thickness of the fiber layer (laminae) formed by wrapping fibers, it may take a long time for the deep portion (innermost layer) of the fiber layer to be completely impregnated with resin.

In view of the foregoing, the present disclosure provides a method for manufacturing a tank and a manufacturing device thereof that can achieve resin impregnation within a short time.

In view of the foregoing, according to one aspect of the present disclosure, there is disclosed a method for manufacturing a tank, the tank including: a hollow liner including a cylindrical straight body portion and a dome portion that narrows gradually in a direction opposite to the straight body portion from an end portion of the straight body portion in an axial direction; and a reinforcing layer formed on an outer surface of the liner by impregnating with resin a fiber layer including fibers wrapped in an overlapping manner in a radial direction, the method including: wrapping the fibers in an overlapping manner in a radial direction around the outer surface of the liner such that a first fiber layer on an outer surface of the dome portion is less dense than a second fiber layer on an outer surface of the straight body portion and such that a portion of a lamina of the first fiber layer, which is less dense, is interposed continuously from the first fiber layer partially between laminae of the second fiber layer; and impregnating the fiber layer including the first fiber layer and the second fiber layer with the resin.

In some embodiments, impregnation of the fiber layer with the resin is performed separately in an axial direction and a radial direction of the liner.

In some embodiments, the resin is poured into the first fiber layer in the axial direction of the liner to impregnate the fiber layer with the resin; and the resin is poured into the second fiber layer in the radial direction of the liner to impregnate the fiber layer with the resin.

In some embodiments, after impregnation of the fiber layer with the resin is performed in the axial direction of the liner, impregnation of the fiber layer with the resin is performed in both of the axial direction and the radial direction of the liner.

In some embodiments, after the resin is poured into the first fiber layer in the axial direction of the liner, the resin is poured into the second fiber layer in the radial direction of the liner while pouring the resin into the first fiber layer in the axial direction of the liner to impregnate the fiber layer with the resin.

In some embodiments, the method includes wrapping fibers in an alternately woven manner around the outer surface of the dome portion to form the first fiber layer; wrapping fibers into a helical form or a hoop form around the outer surface of the straight body portion continuously from the first fiber layer to form the second fiber layer; and interposing a portion of a lamina of the first fiber layer, which is less dense, partially between laminae of the second fiber layer by wrapping fibers in an alternately woven manner continuously from the first fiber layer.

According to another aspect of the present disclosure, there is disclosed a manufacturing device of a tank, the tank including: a hollow liner including a cylindrical straight body portion and a dome portion that narrows gradually in a direction opposite to the straight body portion from an end portion of the straight body portion in an axial direction; and a reinforcing layer formed on an outer surface of the liner by impregnating with resin a fiber layer including fibers wrapped in an overlapping manner in a radial direction, the manufacturing device including: a mold configured to house a preform including the fibers wrapped in an overlapping manner in a radial direction around the outer surface of the liner such that a first fiber layer on an outer surface of the dome portion is less dense than a second fiber layer on an outer surface of the straight body portion and such that a portion of a lamina of the first fiber layer, which is less dense, is interposed continuously from the first fiber layer partially between laminae of the second fiber layer, and to allow impregnation of the fiber layer including the first fiber layer and the second fiber layer with the resin, in which the mold is provided with a plurality of runners defining gates through which the resin flows and that are open in the mold such that impregnation of the fiber layer with the resin is performed separately in an axial direction and a radial direction of the liner, and at least one of the plurality of runners is provided with an opening/closing mechanism.

In some embodiments, the plurality of runners includes a first runner through which the resin is poured into the first fiber layer in the axial direction of the liner and a second runner through which the resin is poured into the second fiber layer in the radial direction of the liner.

In some embodiments, the opening/closing mechanism is configured to open and close at least one of the plurality of runners such that after impregnation of the fiber layer with the resin is performed in the axial direction of the liner, impregnation of the fiber layer with the resin is performed in both of the axial direction and the radial direction of the liner.

In some embodiments, the plurality of runners includes a first runner through which the resin is poured into the first fiber layer in the axial direction of the liner and a second runner through which the resin is poured into the second fiber layer in the radial direction of the liner, the opening/closing mechanism is provided at least in the second runner, and after the resin is poured into the first fiber layer in the axial direction of the liner via the first runner in a state where the second runner is closed by the opening/closing mechanism, in a state where the second runner is opened by the opening/closing mechanism, the resin is poured into the second fiber layer in the radial direction of the liner via the second runner while pouring the resin into the first fiber layer in the axial direction of the liner via the first runner.

According to one aspect of the present disclosure, providing a portion with less dense fibers (low fiber density) in both of the dome portion and the straight body portion during fiber wrapping can reduce resistance in resin pouring. This can facilitate resin impregnation, thereby achieving completion of the resin impregnation within a short time.

In addition, since the resin pouring pressures in different directions (an axial direction and a lamina extending direction, a radial direction and a thickness direction) will not be interfered with each other during resin pouring, it is possible to achieve completion of the resin impregnation in the inner part within a short time.

DETAILED DESCRIPTION

Figure 1:
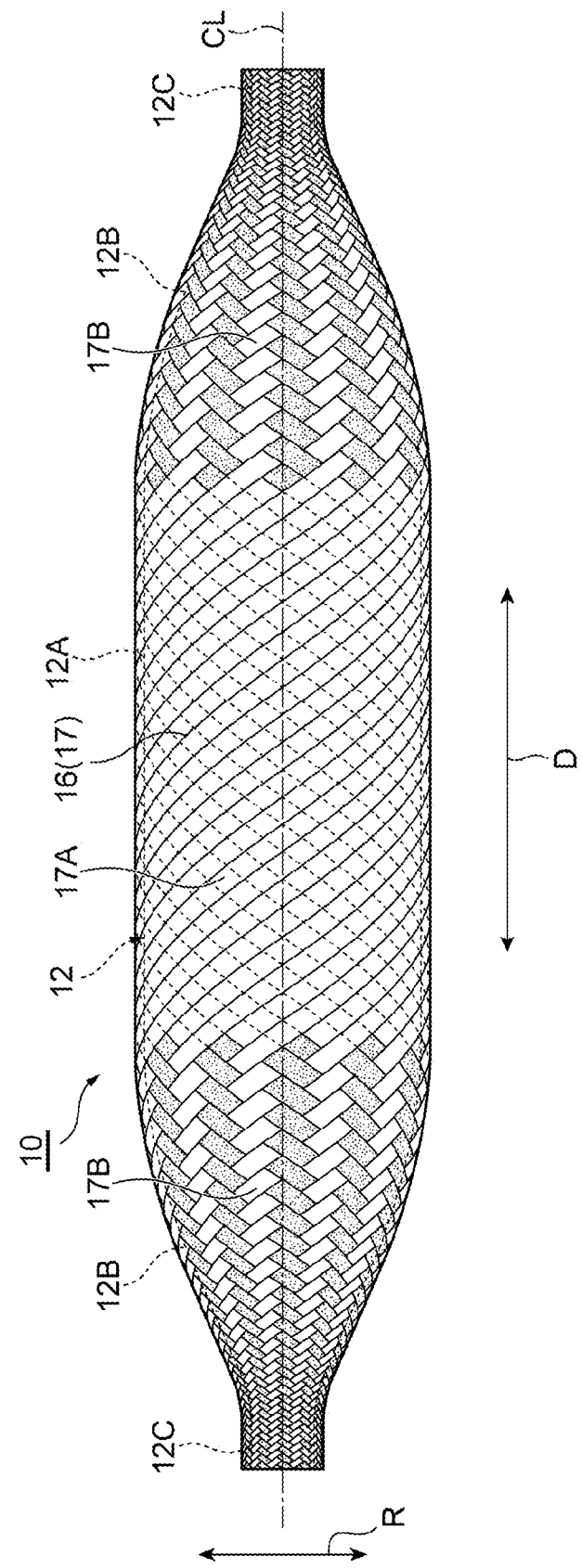
FIG. 1 is a side view schematically showing a high-pressure tank (fiber-wound liner) according to the present embodiment.

Hereinafter, an embodiment of the present disclosure will be described with reference to the drawings.

The following describes an example of a high-pressure tank for fuel cell vehicles that is one example of a tank. The tank, to which the present disclosure is applied, is not limited to the high-pressure tank for fuel cell vehicles. The shape, the material, and the like of the liner and the preform that form the tank are also not limited to the illustrated example.

The RTM method wraps (winds) carbon fibers around a liner multiple times (in multiple layers) to form a preform with a fiber layer on the outer surface of the liner, impregnates the fiber layer of the preform with epoxy resin, and cures the epoxy resin, so as to manufacture a high-pressure tank for fuel cell vehicles including a fiber-reinforced resin layer including the carbon fibers and the epoxy resin on the outer periphery of the liner. The liner is a hollow container made of resin (for example, nylon resin) that defines the internal space of the high-pressure tank.

In such a high-pressure tank for fuel cell vehicles, the carbon fibers are laminated thickly, and so the resin hardly enters into the inner layer of the carbon fibers. When resin is poured at high pressure into the inner layer of the carbon fibers for impregnation, the quality and performance of the tank will deteriorate, such as deformation of the tank. In addition, as the tank has a cylindrical shape, it is hard to uniformly charge resin into the entire tank, making the resin impregnation ununiform. Moreover, pressure tends to concentrate on the vicinity of a gate, so its gate portion is under high pressure, and there is a large pressure difference between the gate portion and a resin flow end portion (i.e., a portion opposite to the gate portion).

That is, the high-pressure tank for fuel cell vehicles has the carbon fibers that are laminated very thickly (about 10 times that of a typical RTM molded body component) to keep enough strength, which makes it difficult to impregnate the fibers with resin. Simple tank rotation as in JP 2019-056415 A does not exert a good effect of resin impregnation into the inner layer of the carbon fibers. In addition, pouring resin at high pressure into the inner layer of the carbon fibers for impregnation may result in ununiform pressure distribution, and in some portion that is partially under high pressure, the quality and performance of the tank will deteriorate, such as deformation of the resin liner inside of the tank. In addition, since resin is less likely to flow to the portion opposite to the gate portion through a narrow gap between the mold and the tank, it is required to rotate the tank within the mold at high speed as disclosed in JP 2019-056415 A in order to flow the resin to the entire part of the tank before it cures. However, such high-speed rotation may cause damage to the carbon fibers due to a small space within the mold.

Then, the present embodiment employs the following configuration.

(Configuration of High-Pressure Tank)

Figure 2:
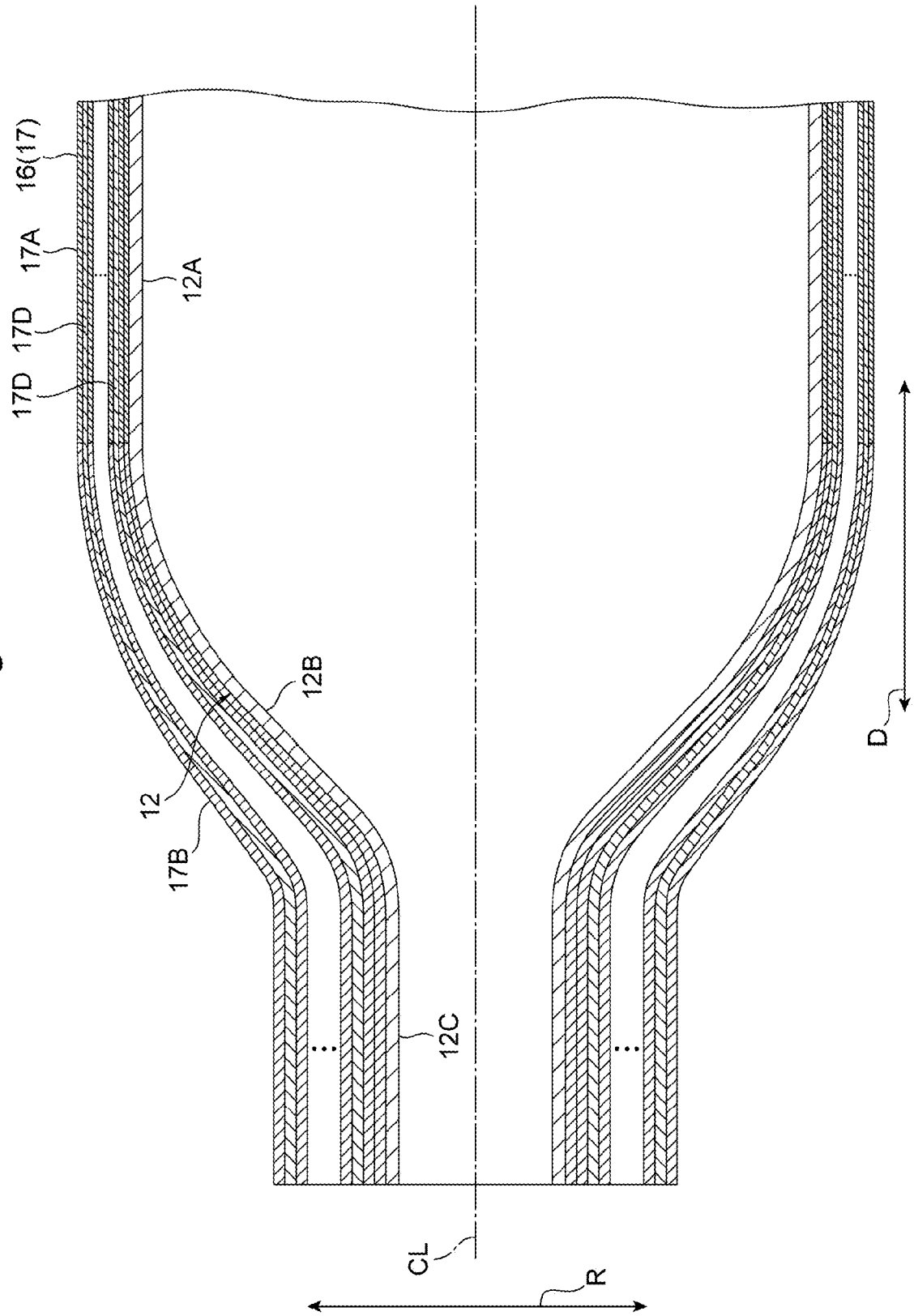
FIG. 2 is a cross-sectional view schematically showing a structure of the high-pressure tank (fiber-wound liner) according to the present embodiment.

First, a structure of a high-pressure tank 10 according to an embodiment of the present disclosure will be described in detail based on the drawings. FIG. 1 and FIG. 2 are respectively a side view and a cross-sectional view schematically showing the high-pressure tank 10 (fiber-wound liner) according to the present embodiment. It should be noted that for convenience of description, as appropriate, the drawings show an arrow D, which indicates an axial direction of the high-pressure tank 10, and an arrow R, which indicates a radial direction of the high-pressure tank 10. In addition, a portion of the high-pressure tank 10 (liner 12) located away from the center in the axial direction along a central axis CL of the high-pressure tank 10 will be referred to as "an end portion in the axial direction." Meanwhile, a portion of the high-pressure tank 10 (liner 12) located closer to the center will be referred to as "a central portion in the axial direction." The high-pressure tank 10 according to the present embodiment is configured to be charged with hydrogen as a fuel, for example, in its interior, and mounted on a fuel cell vehicle (not shown) or the like.

As shown in FIG. 1 and FIG. 2, the high-pressure tank 10 has a liner 12 as a container body. In one example, the liner 12 is blow-molded from a liquid crystalline resin material with an excellent gas barrier property and dimension stability, and includes a cylindrical straight body portion 12A and a substantially hemispherical dome portion 12B formed integrally with each of the opposite ends (end openings) of the straight body portion 12A. More specifically, this liner 12 includes the cylindrical straight body portion 12A, which has a constant inside diameter and outside diameter, in an intermediate portion of the liner 12 in the longitudinal direction (axial direction), and the dome portion 12B, which forms each of the opposite side portions of the liner 12 in the longitudinal direction (axial direction) and narrows gradually (i.e., has a decreasing diameter) in a direction opposite (toward the end portion in the axial direction) to the straight body portion 12A.

The dome portion 12B includes, in its axial central part, a cylindrical portion 12C that protrudes (outwardly) toward the end portion of the liner 12 in the axial direction along the central axis CL. The cylindrical portion 12C has a substantially constant inside diameter and outside diameter that are smaller than those of the straight body portion 12A.

The high-pressure tank 10 is formed by wrapping in a layer form tape-like fibers (also referred to as fiber bundles) 16 with a predetermined width around the outer peripheral surface of the straight body portion 12A of the liner 12 and the outer peripheral surface of the dome portion 12B of the liner 12. The fiber 16 is made of fiber reinforced plastics (FRP) including glass fiber, carbon fiber, or aramid fiber, for example, and forms a fiber-reinforced-plastic layer (FRP layer) as a reinforcing layer on the outer peripheral surface (outer surface) of the liner 12.

Specifically, the fibers 16 are wrapped in an alternately woven manner around the outer peripheral surface (outer surface) of the dome portion 12B (hereinafter this may be referred to as "braided winding"), and the fibers 16 wound in a braided manner form a braiding layer 17B as a first fiber layer. Then, the braiding layer (first fiber layer) 17B is impregnated with a thermosetting resin 18 (FIG. 8, etc.) and cured, thereby forming a reinforcing layer.

Meanwhile, the fibers 16 are helically wrapped around the outer peripheral surface (outer surface) of the straight body portion 12A (hereinafter this may be referred to as "helical winding"), and the helically wound fibers 16 form a helical layer 17A as a second fiber layer. Then, the helical layer (second fiber layer) 17A is impregnated with a thermosetting resin 18 (FIG. 8, etc.) and cured, thereby forming a reinforcing layer.

The helical winding means that the fibers 16 are first wrapped around the entire outer peripheral surface of the straight body portion 12A at a predetermined winding angle $+\theta$ with respect to the central axis CL of the liner 12, and further wrapped around on top thereof (in a crossing direction on top of the fibers 16 wrapped at the winding angle $+\theta$) at a predetermined winding angle $-\theta$ with respect to the central axis CL of the liner 12. That is, the helical layer (second fiber layer) 17A is configured such that the fibers 16 are wrapped into at least two layers around the outer peripheral surface of the straight body portion 12A at a predetermined winding angle $+\theta$ and a predetermined winding angle $-\theta$. It should be noted that in practice, the fibers (bundles) 16 are wrapped (in an overlapping or laminating manner in the radial direction) into about several to several tens of layers, for example, though it depends on the internal pressure of the straight body portion 12A and the number of fibers (bundles) 16, and the like.

As described above, the braided winding means wrapping the fibers 16 in an alternately woven manner, and herein the braided winding means wrapping the fibers 16 around the entire outer peripheral surface of the dome portion 12B at a predetermined winding angle $+\theta$ and a predetermined winding angle $-\theta$ with respect to the central axis CL of the liner 12.

That is, herein, the fibers 16 are wrapped at the same winding angle $\theta$ in both of the braided winding and the helical winding. The winding angle $\theta$ may be within the range of $\theta=54.7°\pm10°$ including tolerances, specifically the range of $\theta=54.7°\pm5°$, more specifically the range of $\theta=54.7°\pm1°$.

This winding angle $\theta$ is an angle derived from stresses (axial stress and circumferential stress) on the straight body portion 12A when a predetermined internal pressure is acting, or, an angle resulting from the fact that the circumferential stress is twice as large as the axial stress. That is, though a detailed calculation process is omitted herein, calculating a winding angle $\theta$ according to stresses based on the netting theory can obtain $\tan^2 \theta=2$, from which $\theta=54.7°$ (equilibrium angle) is derived.

Herein, the dome portion 12B undergoes a smaller stress as compared to the straight body portion 12A when an internal pressure is acting, and thus requires a lower level of reinforcement as compared to the straight body portion 12A. Consequently, as a basic structure, the braided winding (braiding layer 17B) with large fiber intervals, less dense fibers (low density), and a low strength as compared to the helical winding (helical layer 17A) is applied to the dome portion 12B, and the helical winding (helical layer 17A) with small fiber intervals, dense fibers (high density), and a high strength as compared to the braided winding (braiding layer 17B) is applied to the straight body portion 12A.

It should be noted that though description of a detailed structure is omitted herein, switching from the braided winding (braiding layer 17B) in the dome portion 12B to the helical winding (helical layer 17A) in the straight body portion 12A and inversely, switching from the helical winding (helical layer 17A) in the straight body portion 12A to the braided winding (braiding layer 17B) in the dome portion 12B, are performed within an area of a predetermined length in the axial direction near the boundary portion between the straight body portion 12A and the dome portion 12B as viewed in a direction crossing the axial direction along the central axis CL of the liner 12.

In addition, though not shown, in one example, one of the cylindrical portions 12C has a sealing plug fitted therein, and the other of the cylindrical portions 12C has a mouthpiece plug fitted therein, and a valve is mounted on the mouthpiece plug.

Figure 3:
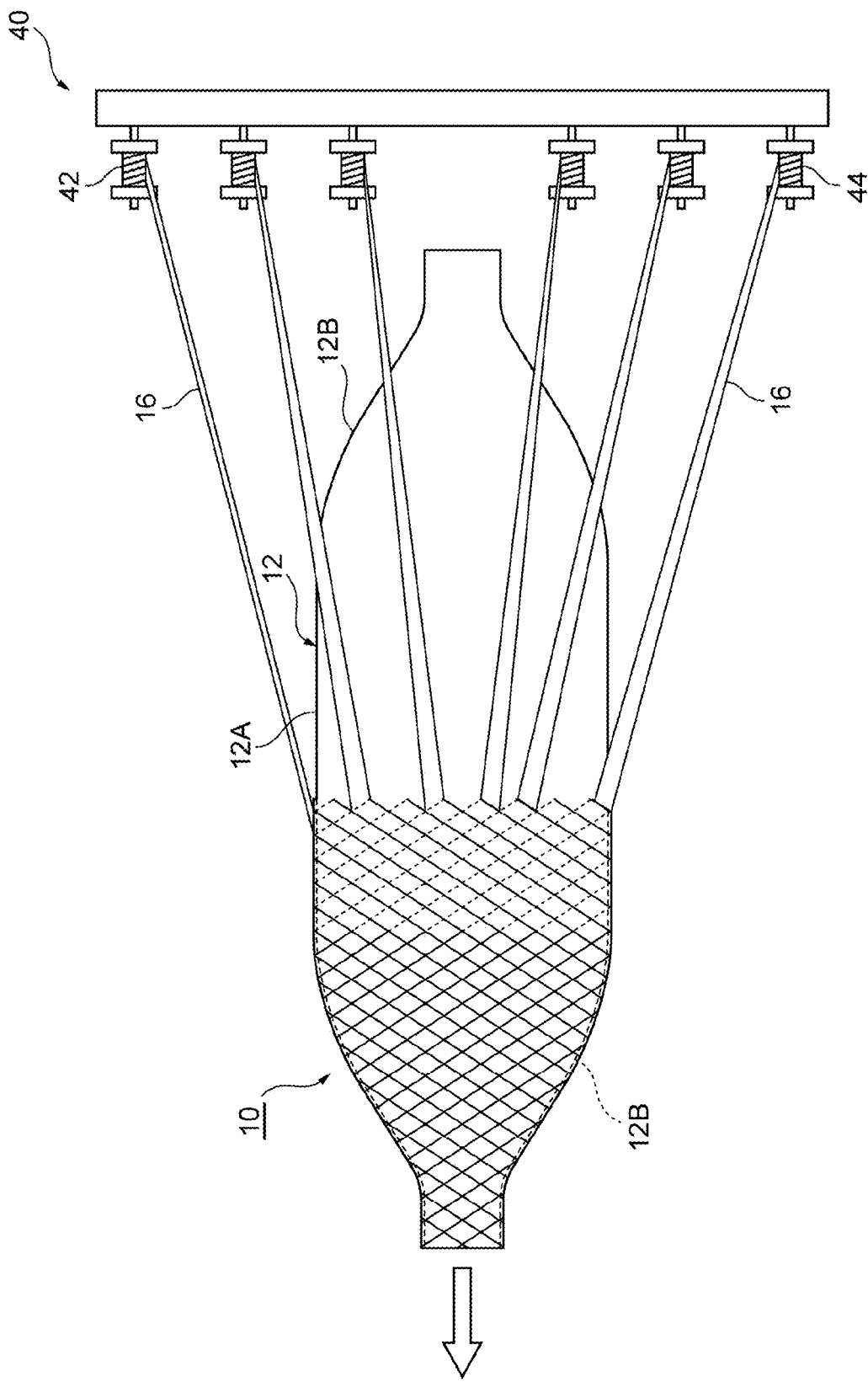
FIG. 3 is a schematic diagram showing a manufacturing machine (braiding machine) for wrapping fibers around a liner that forms the high-pressure tank according to the present embodiment.
Figure 4:
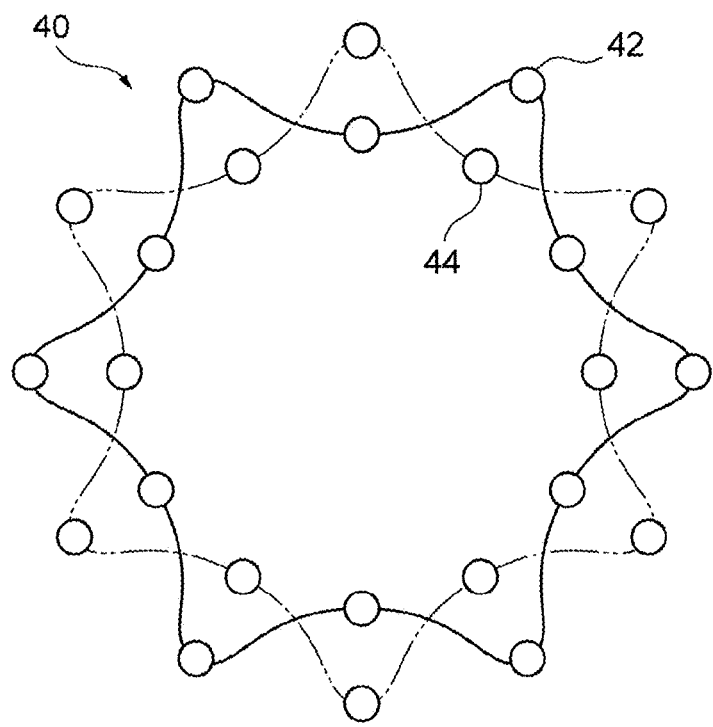
FIG. 4 is a schematic diagram showing positions at which fibers are fed when wrapping the fibers around a dome portion of the high-pressure tank according to the present embodiment.
Figure 5:
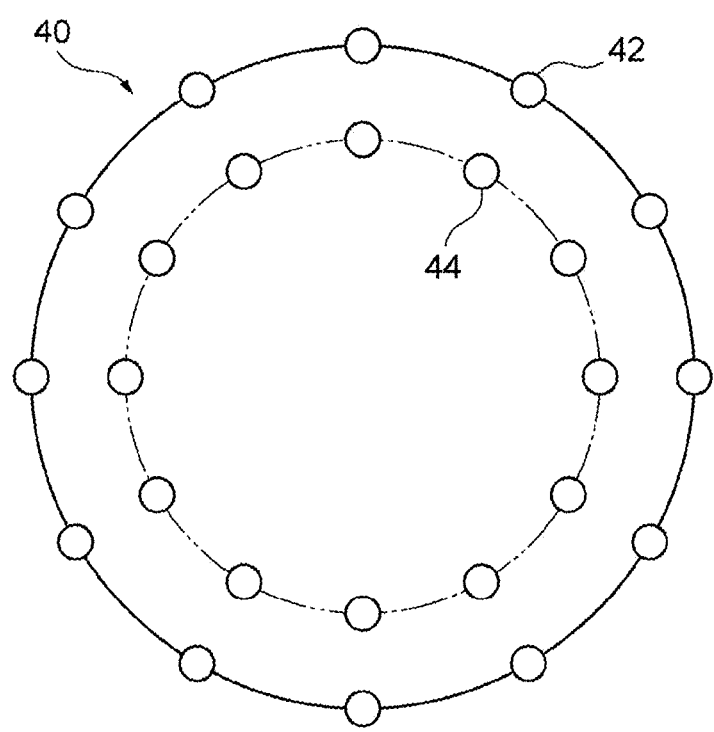
FIG. 5 is a schematic diagram showing positions at which fibers are fed when wrapping the fibers around a straight body portion of the high-pressure tank according to the present embodiment.

As shown in FIG. 3, the fibers 16 are wrapped around the outer peripheral surface of the liner 12 with a known manufacturing machine (also referred to as a braiding machine) 40. As shown in FIG. 4 and FIG. 5, the manufacturing machine 40 includes a plurality of bobbins 42, 44 arranged on the circumference in two rows. The fibers 16 fed from the plurality of bobbins 42, 44 in the respective rows are wrapped around the liner 12 moving in the axial direction along the central axis CL (to the left in FIG. 3), specifically, around the outer peripheral surface of one of the dome portions 12B, the outer peripheral surface of the straight body portion 12A, and then the outer peripheral surface of the other of the dome portions 12B in this order.

It should be noted that in the braided winding of the fibers 16 around the one and the other of the dome portions 12B, as shown in FIG. 4, the plurality of bobbins 42 connected to each other by solid lines and the plurality of bobbins 44 connected to each other by imaginary lines are disposed in the circumferential direction so as to be staggered with respect to each other on the inner side in the radial direction and the outer side in the radial direction. Then, the manufacturing machine 40 is driven such that, while the plurality of bobbins 42 connected to each other by solid lines and the plurality of bobbins 44 connected to each other by imaginary lines move in the opposite directions to each other, the bobbins 42, 44 are successively replaced, that is, the inner one in the radial direction being replaced with the outer one in the radial direction and the outer one in the radial direction being replaced with the inner one in the radial direction.

Meanwhile, in the helical winding of the fibers 16 around the straight body portion 12A, as shown in FIG. 5, the plurality of bobbins 42 connected to each other by solid lines and the plurality of bobbins 44 connected to each other by imaginary lines are disposed in the circumferential direction, respectively on the outer side in the radial direction and the inner side in the radial direction. Then, the manufacturing machine 40 is driven such that the plurality of bobbins 42 connected to each other by solid lines and the plurality of bobbins 44 connected to each other by imaginary lines move in the opposite directions to each other.

In addition to the above-described basic structure of the dome portion 12B by the braided winding (braiding layer 17B) with large fiber intervals, less dense fibers (low density), and a low strength and the straight body portion 12A by the helical winding (helical layer 17A) with small fiber intervals, dense fibers (high density), and a high strength, the present embodiment employs the following configuration to facilitate impregnation of a resin 18 to achieve completion of the impregnation of the resin 18 within a short time.

That is, as shown in FIG. 2, the fibers 16 are wrapped in a layer form around the outer peripheral surface of the straight body portion 12A of the liner 12 and the outer peripheral surface of the dome portion 12B of the liner 12 so that a portion (17D) of the lamina of the braiding layer 17B is interposed continuously from the braiding layer 17B partially between the laminae (including inside of the innermost layer and outside of the outermost layer) of the helical layer 17A (consisting of about several to several tens of layers, for example).

Specifically, at a predetermined position of the lamina of the braiding layer 17B on the outer peripheral surface (outer surface) of the dome portion 12B, after the fibers 16 are wrapped in an alternately woven manner (i.e., after braided winding), continuously therefrom (i.e., without switching from braided winding to helical winding), the fibers 16 are wrapped in an alternately woven manner around on top of the helical layer 17A (helical layer 17A adjacent to the braiding layer 17B) (in the case of the innermost layer, the outer peripheral surface of the straight body portion 12A) on the outer peripheral surface (outer surface) of the straight body portion 12A (the 17D portion in FIG. 2). It should be noted that after the fibers 16 are wrapped in an alternately woven manner around on top of the helical layer 17A on the outer peripheral surface (outer surface) of the straight body portion 12A, continuously therefrom, the fibers 16 are wrapped in an alternately woven manner (i.e., braided winding is performed) around on top the braiding layer 17B (braiding layer 17B adjacent to the helical layer 17A) on the outer peripheral surface (outer surface) of the other of the dome portions 12B, thereby further forming the braiding layer 17B on the outer peripheral surface (outer surface) of the other of the dome portions 12B (see also FIG. 6).

Through the above-described wrapping of the fibers 16 at one position (in one layer) or multiple positions (in multiple layers) between the laminae (including inside of the innermost layer and outside of the outermost layer) of the helical layer 17A (consisting of about several to several tens of layers, for example), the portion (17D) of the lamina of the braiding layer 17B is interposed continuously from the braiding layer 17B between the laminae of the helical layer 17A. It should be noted that between the laminae of the helical layer 17A, one lamina of the braiding layer 17B may be interposed or multiple laminae of the braiding layer 17B may be collectively interposed. FIG. 2 shows an example of interposing one lamina of the braiding layer 17B.

In this way, a portion of the lamina of the braiding layer 17B with large fiber intervals and less dense fibers (low density) is interposed (continuously from the braiding layer 17B) between the laminae of the helical layer 17A with small fiber intervals and dense fibers (high density). This facilitates impregnation of the resin 18 (in particular, in the helical layer 17A on the outer peripheral surface of the straight body portion 12A) during resin pouring, which will be described later, thus allowing completion of the impregnation of the resin 18 within a short time.

As described above, to form the high-pressure tank 10, a fiber layer 17 including the braiding layer 17B and the helical layer 17A (including the portion 17D of the lamina of the braiding layer 17B between the laminae of the helical layer 17A), formed by wrapping the fibers 16 in a layer form around the liner 12, is impregnated with an uncured thermosetting resin (for example, a mixture of an epoxy resin and a hardener; this may be simply referred to as "resin" in this specification) 18 having flowability, and then heated to allow the thermosetting resin to cure.

(Method for Manufacturing High-Pressure Tank)

A method for manufacturing the high-pressure tank 10 having the above-described configuration will be described in detail based on the drawings.

(Fiber Winding Step)

The high-pressure tank 10 according to the present embodiment is formed by firstly wrapping the fibers 16 around the outer peripheral surface of the liner 12. That is, as shown in FIG. 3 to FIG. 5, the fibers 16 are successively fed from the plurality of bobbins 42, 44 of the manufacturing machine 40, and firstly wound in a braided manner around the outer peripheral surface of one of the dome portions 12B to form the braiding layer 17B (first step). Specifically, the fibers 16 are successively wound in a braided manner around the dome portion 12B from the end portion opposite to the straight body portion 12A to the end portion close to the straight body portion 12A to form the braiding layer 17B.

After the end of the braided winding of the fibers 16 around the outer peripheral surface of one of the dome portions 12B, the fibers 16 are then helically wound around the outer peripheral surface of the straight body portion 12A to form the helical layer 17A (second step). Specifically, the fibers 16 are helically wound successively around the straight body portion 12A from the end portion close to the one of the dome portions 12B to the end portion close to the other of the dome portions 12B to form the helical layer 17A. It should be noted that switching from the braided winding in the dome portion 12B to the helical winding in the straight body portion 12A is performed within an area of a predetermined length in the axial direction near the boundary portion between the dome portion 12B and the straight body portion 12A by switching the arrangement of the plurality of bobbins 42, 44 of the manufacturing machine 40 (FIG. 4 and FIG. 5) within a predetermined time. Here, within the above-mentioned area, the fibers 16 can be smoothly switched from the braided winding to the helical winding at the same winding angle θ.

After the end of the helical winding of the fibers 16 around the outer peripheral surface of the straight body portion 12A, the fibers 16 are then wound in a braided manner around the outer peripheral surface of the other of the dome portions 12B to form the braiding layer 17B (third step). Specifically, the fibers 16 are wound in a braided manner successively around the dome portion 12B from the end portion close to the straight body portion 12A to the end portion opposite to the straight body portion 12A to form the braiding layer 17B. It should be noted that switching from the helical winding in the straight body portion 12A to the braided winding in the dome portion 12B is also performed within an area of a predetermined length in the axial direction near the boundary portion between the straight body portion 12A and the dome portion 12B by switching the arrangement of the plurality of bobbins 42, 44 of the manufacturing machine 40 (FIG. 4 and FIG. 5) within a predetermined time. Here, within the above-mentioned area, the fibers 16 can be smoothly switched from the helical winding to the braided winding at the same winding angle θ.

It should be noted that the winding angle θ of the fibers 16 wrapped around the one and the other of the dome portions 12B and the straight body portion 12A is within the range of θ=54.7°±10°, for example.

In the present embodiment, at a predetermined position of the lamina of the braiding layer 17B, after the end of the braided winding of the fibers 16, without performing the above-described switching from the braided winding in the dome portion 12B to the helical winding in the straight body portion 12A, continuously therefrom, the fibers 16 are wound in a braided manner around the outer peripheral surface of the straight body portion 12A (specifically, the outer peripheral surface of the laminated portion of the helical layer 17A on the outer peripheral surface of the straight body portion 12A) to form the braiding layer (portion corresponding to 17D of FIG. 2). In addition, after the end of the braided winding of the fibers 16 around the outer peripheral surface of the straight body portion 12A (specifically, the outer peripheral surface of the laminated portion of the helical layer 17A on the outer peripheral surface of the straight body portion 12A), continuously therefrom (without performing the above-described switching from the helical winding in the straight body portion 12A to the braided winding in the dome portion 12B), the fibers 16 are wound in a braided manner around the outer peripheral surface of the other of the dome portions 12B to form the braiding layer 17B (FIG. 6).

Figure 6:
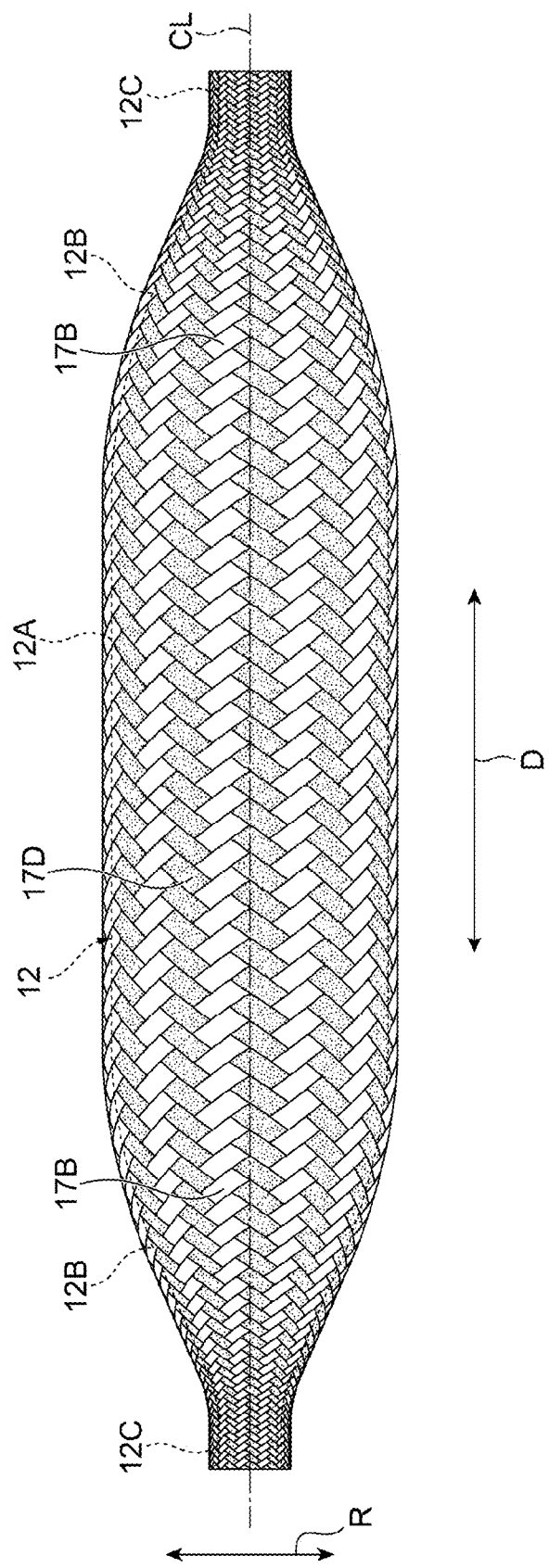
FIG. 6 is a side view schematically showing a laminated portion where a lamina of a braiding layer is interposed between laminae of a helical layer in the high-pressure tank (fiber-wound liner) according to the present embodiment.

In other words, at a predetermined position of the lamina of the braiding layer 17B, the fibers 16 are wound in a braided manner successively from the end portion of the one of the dome portions 12B opposite to the straight body portion 12A to the end portion of the other of the dome portions 12B opposite to the straight body portion 12A (across the entire length of the liner 12 in the axial direction) to form the braiding layer (17B, 17D, 17B) (FIG. 6).

Through the above-described wrapping of the fibers 16 at one position (in one layer) or multiple positions (in multiple layers) between the laminae (including inside of the innermost layer and outside of the outermost layer) of the helical layer 17A (consisting of about several to several tens of layers, for example), the portion (17D) of the lamina of the braiding layer 17B is interposed continuously from the braiding layer 17B between the laminae of the helical layer 17A.

Through the above-described steps, the fibers 16 are wrapped (in an overlapping or laminating manner in the radial direction) finally into about several to several tens of layers, for example, to form a preform 11 (FIG. 7 to FIG. 10) as an intermediate body, which includes the fiber layer 17 (i.e., the braiding layer 17B and the helical layer 17A (including the portion 17D of the lamina of the braiding layer 17B between the laminae of the helical layer 17A)) formed by wrapping the fibers 16, on the outer peripheral surface (outer surface) of the hollow liner 12.

(Resin Pouring (Resin Transfer Molding) Step)

The preform 11 (FIG. 7 to FIG. 10) including the fiber layer 17 formed by wrapping the fibers 16 around the hollow liner 12 as described above is placed in a mold 50 (also referred to as a cavity between a lower mold 60 and an upper mold 80) for resin transfer molding as a manufacturing device. The thermosetting resin 18 is poured into the mold 50. The fiber layer 17 (or the fibers 16 thereof) is impregnated with the thermosetting resin 18, and then heated to allow the thermosetting resin 18 to cure.

Figure 7:
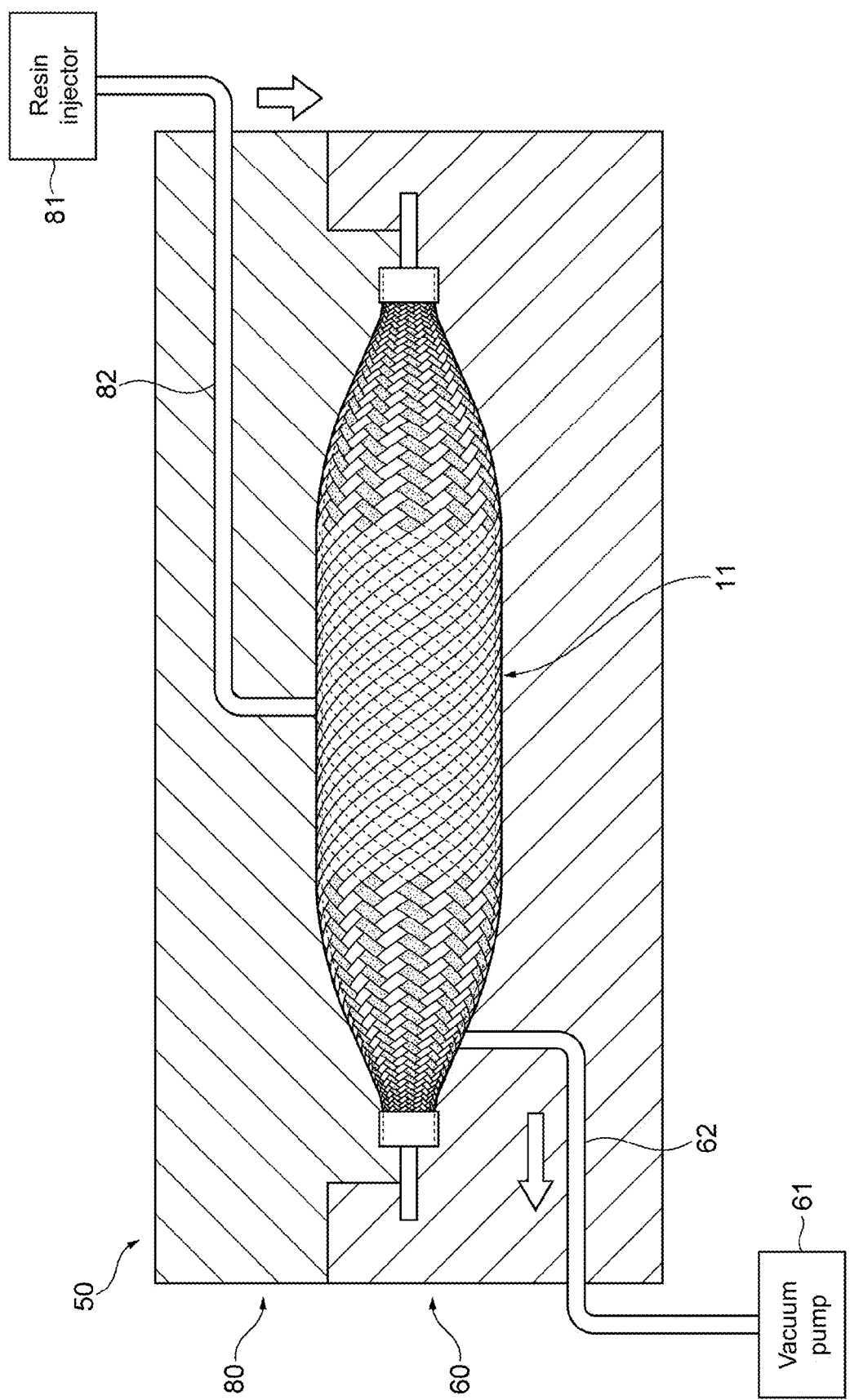
FIG. 7 is a vertical cross-sectional view showing a preform placing step and a vacuum degassing step of a manufacturing device (mold for resin transfer molding) of the high-pressure tank according to the present embodiment.
Figure 8:
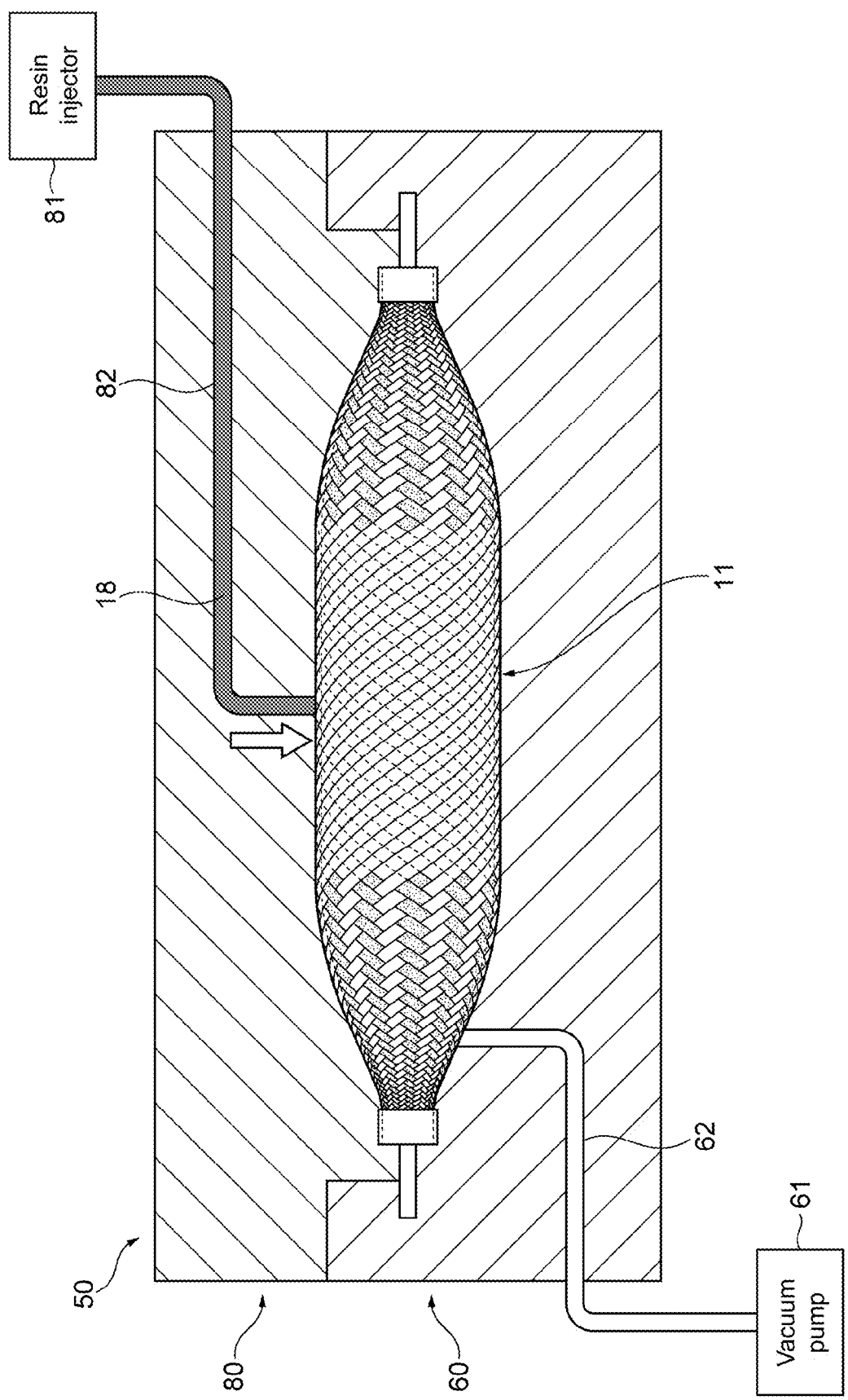
FIG. 8 is a vertical cross-sectional view showing a resin pouring step of the manufacturing device (mold for resin transfer molding) of the high-pressure tank according to the present embodiment.

Specifically, as shown in FIG. 7 and FIG. 8, a vacuum degassing pipe 62 coupled to a vacuum pump 61 is embedded in the mold 50 (the lower mold 60 in the illustrated example).

In addition, a resin injection pipe (also referred to as a resin injection gate) 82 coupled to a resin injector 81 is embedded in the mold 50 (the upper mold 80 in the illustrated example).

Figure 9:
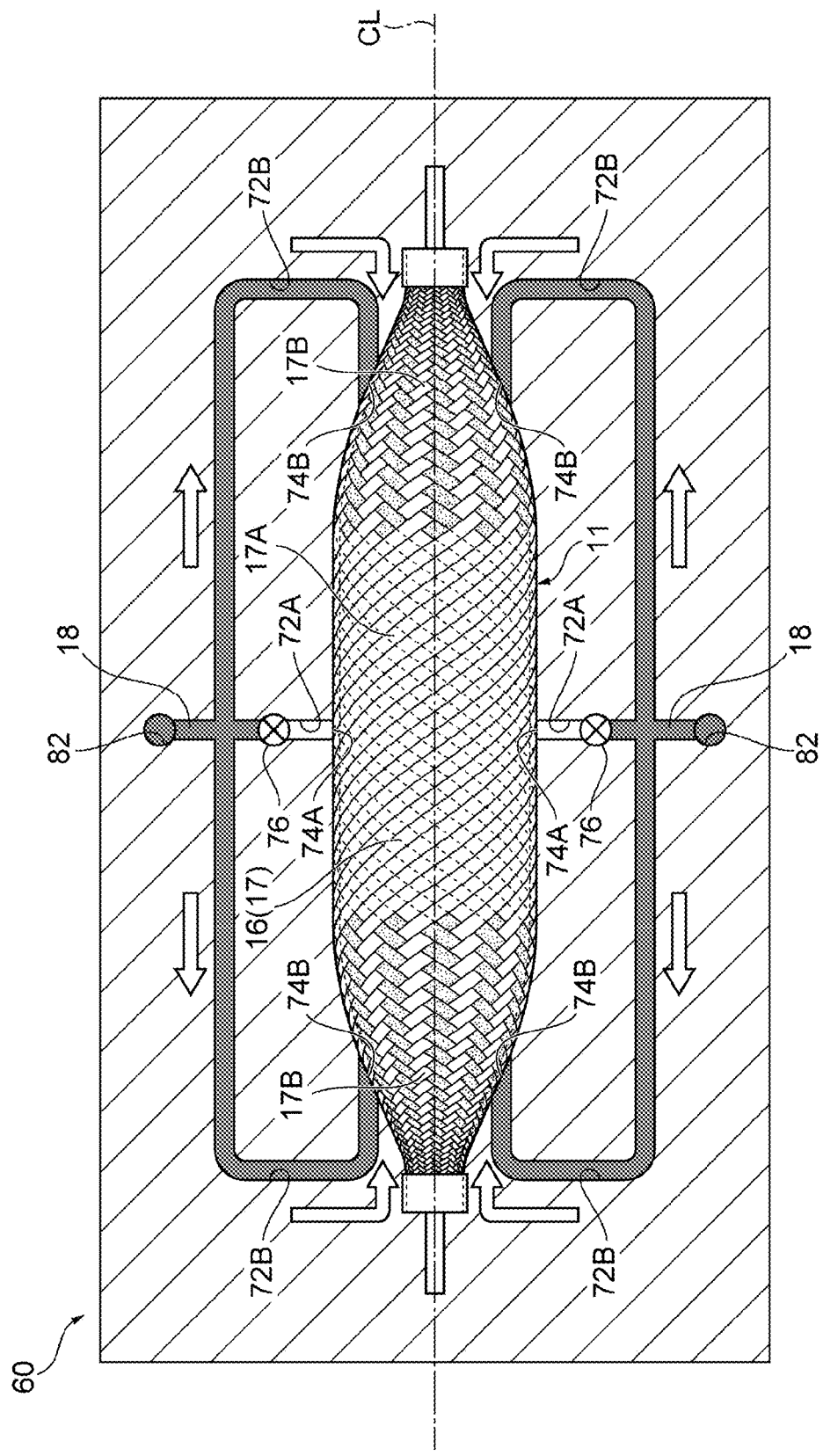
FIG. 9 is a top view of a lower mold in which an upper mold is removed, illustrating the resin pouring step when an opening/closing mechanism is closed in the manufacturing device (mold for resin transfer molding) of the high-pressure tank according to the present embodiment.
Figure 10:
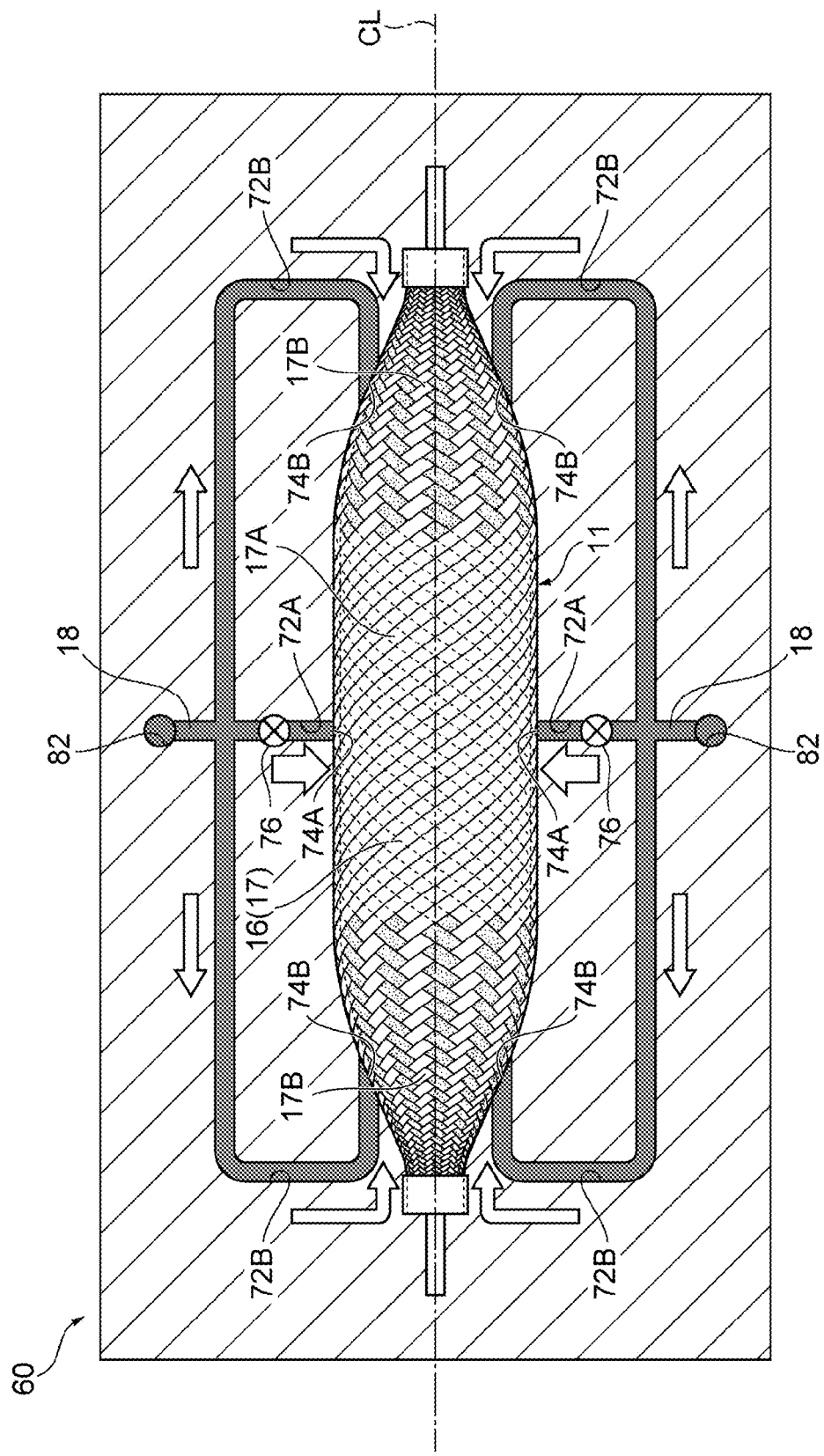
FIG. 10 is a top view of a lower mold in which an upper mold is removed, illustrating the resin pouring step when an opening/closing mechanism is open in the manufacturing device (mold for resin transfer molding) of the high-pressure tank according to the present embodiment.

In addition, as shown in FIG. 9 and FIG. 10, the mold 50 (the lower mold 60 in the illustrated example) is provided with a plurality of runners (72A, 72B) being in continuous with the resin injection pipe 82 and defining gates (resin injection ports) through which the resin 18 flows and that are open to the cavity. In a central portion of the preform 11 in the axial direction (that is, near the central portion of the straight body portion 12A), the runner 72A extends from the resin injection pipe 82 to the preform 11 in the radial direction. A gate 74A defined by the runner 72A is open in the radial direction of the preform 11 in the central portion of the preform 11 in the axial direction (that is, near the central portion of the straight body portion 12A). Consequently, it is possible to pour the resin 18 from the gate 74A to the helical layer (second fiber layer) 17A on the outer peripheral surface of the straight body portion 12A in the mold 50 (cavity) in the radial direction (i.e., in a thickness direction and a laminating direction of the helical layer 17A) of the preform 11. Meanwhile, the runner 72B extends such that it branches from the runner 72A, which extends from the resin injection pipe 82 in the radial direction of the preform 11, to the opposite sides of the preform 11 in the axial direction. A gate 74B defined by the runner 72B is open in the axial direction of the preform 11 at the opposite end portions of the preform 11 in the axial direction (that is, near the central portion of the dome portion 12B at the opposite ends). Consequently, it is possible to pour the resin 18 from the gate 74B to the braiding layer (first fiber layer) 17B on the outer peripheral surface of the dome portion 12B in the mold 50 (cavity) in the axial direction (i.e., in a lamina extending direction of the helical layer 17A) of the preform 11.

It should be noted that in the example shown in FIG. 9 and FIG. 10, the runners 72A located at the central portion of the preform 11 in the axial direction and the runners 72B located at the opposite end portions of the preform 11 in the axial direction are formed such that the runners 72A are opposed to each other and the runners 72B are opposed to each other with respect to the central axis CL of the preform 11 (i.e., in pairs on the front and rear sides of the preform 11).

In addition, in the present embodiment, the runner 72A located at the central portion of the preform 11 in the axial direction is provided with an opening/closing mechanism 76 including an on-off valve and the like to open and close the runner 72A at a predetermined timing. For example, closing the runner 72A by the opening/closing mechanism 76 can interrupt the pouring of the resin 18 from the gate 74A into the mold 50 (cavity).

To impregnate the fiber layer 17 (or the fibers 16 thereof) of the preform 11 with the thermosetting resin 18, first, in a state where the preform 11 is placed in the mold 50 (between the lower mold 60 and the upper mold 80) with the above configuration, which is kept at a predetermined temperature (a temperature equal to or higher than a curing temperature of the thermosetting resin 18) (in other words, after completion of mold clamping), the vacuum pump 61 is controlled for vacuum degassing the mold 50 (FIG. 7).

After stopping (or completion of) the above-stated vacuum degassing, the thermosetting resin 18 is poured into the mold 50 by driving the resin injector 81 (FIG. 8). Here, pouring of the thermosetting resin 18 into the fiber layer 17 (impregnating the fiber layer 17 with the thermosetting resin 18) of the preform 11 placed in the mold 50 is performed separately in the axial direction (the lamina extending direction) and the radial direction (the thickness direction and the laminating direction) of the preform 11 (liner 12).

Specifically, first, in a state where the opening/closing mechanism 76 is closed (that is, in a state where the runner 72A is closed and pouring of the resin 18 into the mold 50 from the gate 74A is interrupted), the (uncured) resin 18 flows through the resin injection pipe 82 and is poured (injected) via the runner 72B from the gate 74B into the braiding layer (first fiber layer) 17B on the outer peripheral surface of the dome portion 12B in the mold 50 (cavity) in the axial direction of the preform 11 (FIG. 9).

Accordingly, the resin 18 is poured (injected) into the braiding layer (first fiber layer) 17B with large fiber intervals and less dense fibers (low density) in the axial direction of the preform 11, and the resin 18 enters into the fiber layer 17. At this time, since the portion (17D) of the lamina of the braiding layer 17B is interposed continuously from the braiding layer 17B between the laminae of the helical layer 17A (see FIG. 2), the resin 18 enters (through the braiding layer 17B) also between the laminae of the helical layer 17A with small fiber intervals and dense fibers (high density).

After that, the opening/closing mechanism 76 is controlled to be open, and in a state where the opening/closing mechanism 76 is open (in a state where the runner 72A is open), the (uncured) resin 18 flows through the resin injection pipe 82 and is poured (injected) via the runner 72B from the gate 74B into the braiding layer (first fiber layer) 17B on the outer peripheral surface of the dome portion 12B in the mold 50 (cavity) in the axial direction of the preform 11, and also poured (injected) via the runner 72A from the gate 74A into the helical layer (second fiber layer) 17A on the outer peripheral surface of the straight body portion 12A in the mold 50 (cavity) in the radial direction of the preform 11 (FIG. 10).

Accordingly, the resin 18 is poured (injected) into the braiding layer (first fiber layer) 17B with large fiber intervals and less dense fibers (low density) in the axial direction of the preform 11 and the resin 18 is poured (injected) into the helical layer (second fiber layer) 17A with small fiber intervals and dense fibers (high density) in the radial direction of the preform 11 (in other words, the resin 18 is poured in both of the axial direction and the radial direction of the preform 11), and the resin 18 enters into the entire fiber layer 17.

It should be noted that a timing of opening the opening/closing mechanism 76 (that is, a timing of pouring the resin 18 via the runner 72A from the gate 74A) may be determined based on a measurement obtained by a pressure sensor for detecting a pressure of the flowing resin 18 or may be determined based on a timing obtained in advance through experiments or the like.

After the laminae of the fiber layer 17 are completed impregnated with the resin 18, resin pouring is stopped, and then heating and curing are performed, whereby a fiber-reinforced resin layer as a reinforcing layer is formed on the outer periphery of the liner 12. As a result, it is possible to obtain the high-pressure tank 10 with excellent corrosion resistance that may achieve weight reduction and low costs and is also easy to carry and handle.

As described above, when a high-pressure tank for fuel cell vehicles is manufactured by the RTM impregnation technology, it is difficult to perform charging, impregnation, and curing of epoxy resin entirely on the thickly-laminated, large tank (with thickly wound carbon fibers) while uniformly applying a resin pressure, and reduction of the productivity and degradation of the tank performance may occur. In addition, since the carbon fibers are laminated thickly on the tank, the resin hardly enters into the innermost layer of the carbon fibers unless the resin is charged at high pressure. This may cause an excessively high pressure in the portion immediately below the gate and the like, resulting in critical quality problems leading to reduction of the productivity and degradation of the tank performance, such as deformation of the resin liner inside of the tank or fiber misalignment.

The present embodiment is directed to significant improvement of resin flowability in a laminate tank, and provides a method for manufacturing a tank including dome portions and a straight body portion. The method includes preparing a liner, winding fibers around the prepared liner, pouring resin into the wound fibers, and curing the poured resin. In the winding, the method winds the fibers around the liner such that the dome portion is less dense than the straight body portion, and in the pouring, the method first pours the resin into the dome portion, and interposes a less dense lamina (continuously from the braiding layer) between laminae of the straight body portion (or the helical layer thereof) in order to improve impregnation properties in a lamina extending direction.

In resin impregnation, the method includes both resin pouring in the lamina extending direction and resin pouring in the thickness direction and the laminating direction, and separately performs the resin pouring in the lamina extending direction and the resin pouring in the thickness direction and the laminating direction. The method first performs the resin pouring in the lamina extending direction and controls impregnation properties to improve the impregnation properties in the entire tank.

The mold 50 includes the opening/closing mechanism 76 in the runner through which resin flows in the RTM mold, and the method first pours resin into the dome portion with a tank structure of less dense fibers and excellent impregnation properties, on which resin flows in the lamina extending direction. After completion of resin impregnation in the lamina extending direction, the method pours resin in the thickness direction with a time difference, whereby, without impairing impregnation properties in the respective directions, it is possible to control the impregnation properties and achieve feedback-automatic-controlling of the resin flowability by observing the resin flow pressure, and the like.

Since the method can pour resin in the lamina extending direction, the resin can enter into the inner layer of the carbon fibers and can enter even farther into the inner layer of the carbon fibers. In addition, it is possible to achieve uniform resin impregnation even when a tank is extended in shape in the axial direction. Moreover, since the resin pouring pressures in different directions (lamina extending direction, thickness direction) will not be interfered with each other, the resin can enter even farther into the inner layer of the carbon fibers. In addition, since the method performs resin pouring in the lamina extending direction with low resistance, it is possible to reduce the movement of the fiber with viscosity of the resin, and reduce the occurrence of fiber misalignment even in the resin pouring in the thickness direction.

With such a configuration, in the epoxy resin impregnation by the RTM impregnation technology, since it is possible to impregnate the entire tank with epoxy resin uniformly and at low pressure in both of the lamina extending direction and the thickness direction, it is possible to achieve an improved performance and a stable quality of the high-pressure tank as well as high-speed resin charging. This can achieve significantly shorter molding cycles of the high-pressure tank.

As described above, according to the present embodiment, providing a portion with less dense fibers (low fiber density) in both of the dome portion 12B and the straight body portion 12A during fiber wrapping can reduce resistance in resin pouring. This can facilitate impregnation of the resin 18, thereby achieving completion of the resin impregnation within a short time.

In addition, since the pouring pressures of the resin 18 in different directions (the axial direction and the lamina extending direction, the radial direction and the thickness direction) will not be interfered with each other during resin pouring, it is possible to achieve completion of the resin impregnation in the inner layer within a short time.

It should be noted that in the foregoing embodiment, although the portion of the lamina of the braiding layer 17B is interposed on the entire surface between the laminae of the helical layer 17A (so as to cover the entire outer peripheral surface of the helical layer 17A) (see FIG. 6), it is needless to mention that the portion of the lamina of the braiding layer 17B may be interposed only on a part of the surface between the laminae of the helical layer 17A.

In addition, although the fibers are helically wrapped around the outer peripheral surface of the straight body portion 12A (by helical winding) to form a helical layer, the fibers may be wrapped into a hoop form around the outer peripheral surface of the straight body portion 12A (by hoop winding) to form a hoop layer, for example, by appropriately adjusting a winding angle θ. In addition, it is needless to mention in detail that the way of fiber winding is not limited to the foregoing embodiment as long as a first fiber layer formed by wrapping the fibers around the outer peripheral surface of the dome portion 12B is less dense (i.e., has a lower fiber density) than a second fiber layer formed by wrapping the fibers around the outer peripheral surface of the straight body portion 12A.

In addition, for example, the material of the liner 12 is not limited to liquid crystalline resin. The liner 12 may be made of, for example, another synthetic resin having a gas barrier property, such as high density polyethylene, or a lightweight metal, such as an aluminum alloy. In addition, the liner 12 is not limited to the one manufactured through blow-molding, and may be manufactured through injection molding or the like.

Although the embodiment of the present disclosure has been described in detail above with reference to the drawings, specific structures are not limited thereto, and any design changes that fall within the spirit and scope of the present disclosure are encompassed by the scope of the present disclosure.

DESCRIPTION OF SYMBOLS

10 High-pressure tank (tank)
11 Preform
12 Liner
12A Straight body portion
12B Dome portion
12C Cylindrical portion
16 Fiber
17 Fiber layer
17A Helical layer (second fiber layer)
17B Braiding layer (first fiber layer)
18 Thermosetting resin (resin)
50 Mold
60 Lower mold
72A, 72B Runner
74A, 74B Gate
76 Opening/closing mechanism
80 Upper mold
CL Central axis

What is claimed is:

1. A method for manufacturing a tank, the tank including: a hollow liner including a cylindrical straight body portion and a dome portion that narrows in a direction opposite to the straight body portion from an end portion of the straight body portion in an axial direction; and a reinforcing layer formed on an outer surface of the liner by impregnating with resin a fiber layer including fibers wrapped in an overlapping manner in a radial direction, the method comprising:
wrapping the fibers in the overlapping manner in the radial direction around the outer surface of the liner such that a first fiber layer on an outer surface of the dome portion is less dense than a second fiber layer on an outer surface of the straight body portion and such that a portion of a lamina of the first fiber layer, which is less dense, is interposed continuously from the first fiber layer partially between laminae of the second fiber layer; and impregnating the fiber layer including the first fiber layer and the second fiber layer with the resin.

2. The method for manufacturing a tank according to claim 1, wherein impregnation of the fiber layer with the resin is performed separately in an axial direction of the liner and a radial direction of the liner.

3. The method for manufacturing a tank according to claim 2, wherein the resin is poured into the first fiber layer in the axial direction of the liner to impregnate the fiber layer with the resin; and the resin is poured into the second fiber layer in the radial direction of the liner to impregnate the fiber layer with the resin.

4. The method for manufacturing a tank according to claim 2, wherein after impregnation of the fiber layer with the resin is performed in the axial direction of the liner, impregnation of the fiber layer with the resin is performed in both of the axial direction of the liner and the radial direction of the liner.

5. The method for manufacturing a tank according to claim 2, wherein after the resin is poured into the first fiber layer in the axial direction of the liner, the resin is poured into the second fiber layer in the radial direction of the liner while pouring the resin into the first fiber layer in the axial direction of the liner to impregnate the fiber layer with the resin.

6. The method for manufacturing a tank according to claim 1, comprising:

wrapping fibers in an alternately woven manner around the outer surface of the dome portion to form the first fiber layer;

wrapping fibers into a helical form or a hoop form around the outer surface of the straight body portion continuously from the first fiber layer to form the second fiber layer; and interposing a portion of a lamina of the first fiber layer, which is less dense, partially between laminae of the second fiber layer by wrapping fibers in the alternately woven manner continuously from the first fiber layer.

* * * * *